(12) United States Patent
Chan et al.

(10) Patent No.: US 7,106,856 B1
(45) Date of Patent: Sep. 12, 2006

(54) METHOD AND APPARATUS FOR PERFORMING ECHO CANCELLATION WITHIN A COMMUNICATION NETWORK

(75) Inventors: Norman C. Chan, Louisville, CO (US); SuJeanne Foster, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/482,717

(22) Filed: Jan. 12, 2000

(51) Int. Cl.
*H04M 9/08* (2006.01)

(52) U.S. Cl. .............. 379/406.01; 379/406.02; 379/406.04; 370/286; 370/389

(58) Field of Classification Search ................ 379/406.01–406.16
See application file for complete search history.

(56) References Cited

U.S. PATENT DOCUMENTS

| | | | |
|---|---|---|---|
| 5,351,291 A | 9/1994 | Menez | 379/410 |
| 5,428,491 A | 6/1995 | Smith | 360/113 |
| 5,477,534 A | 12/1995 | Kusano | 370/32.1 |
| 5,579,305 A | 11/1996 | Norrell | 370/32.1 |
| 5,587,998 A | 12/1996 | Velardo, Jr. | 370/289 |
| 5,764,759 A * | 6/1998 | Hamilton et al. | 379/406.08 |
| 5,835,486 A * | 11/1998 | Davis et al. | 370/287 |
| 6,055,311 A * | 4/2000 | Drefert et al. | 379/406.08 |
| H001885 H * | 10/2000 | Pruett et al. | 379/406.04 |
| 6,141,345 A * | 10/2000 | Goeddel et al. | 370/389 |
| 6,580,793 B1 * | 6/2003 | Dunn et al. | 379/406.04 |

FOREIGN PATENT DOCUMENTS

| | | | |
|---|---|---|---|
| EP | WO 9800960 | * | 1/1998 |
| JP | 05-268121 | | 10/1993 |
| JP | 05268121 | * | 10/1993 |
| WO | 98/00960 | | 1/1998 |
| WO | WO 98/00960 | | 1/1998 |
| WO | 98/34353 | | 8/1998 |
| WO | WO 98/34353 | | 8/1998 |

OTHER PUBLICATIONS

European Search Report, Oct. 30, 2001, on EP01300253.

* cited by examiner

*Primary Examiner*—Sinh Tran
*Assistant Examiner*—Ramnandan Singh
(74) *Attorney, Agent, or Firm*—Sheridan Ross P.C.

(57) ABSTRACT

A switching center for use in a communication network includes a pool of echo cancellation units for use in providing echo cancellation services to users associated with the switching center on an "as needed" basis. A communication connection being supported by the switching center is analyzed to determine whether intolerable reflections are being received from an associated trunk. If such reflections are detected, one of the echo cancellation units in the pool is assigned to the communication connection for use in reducing or eliminating the reflections. When the communication connection terminates, the echo cancellation unit is returned to the pool for subsequent use with another communication connection.

16 Claims, 4 Drawing Sheets

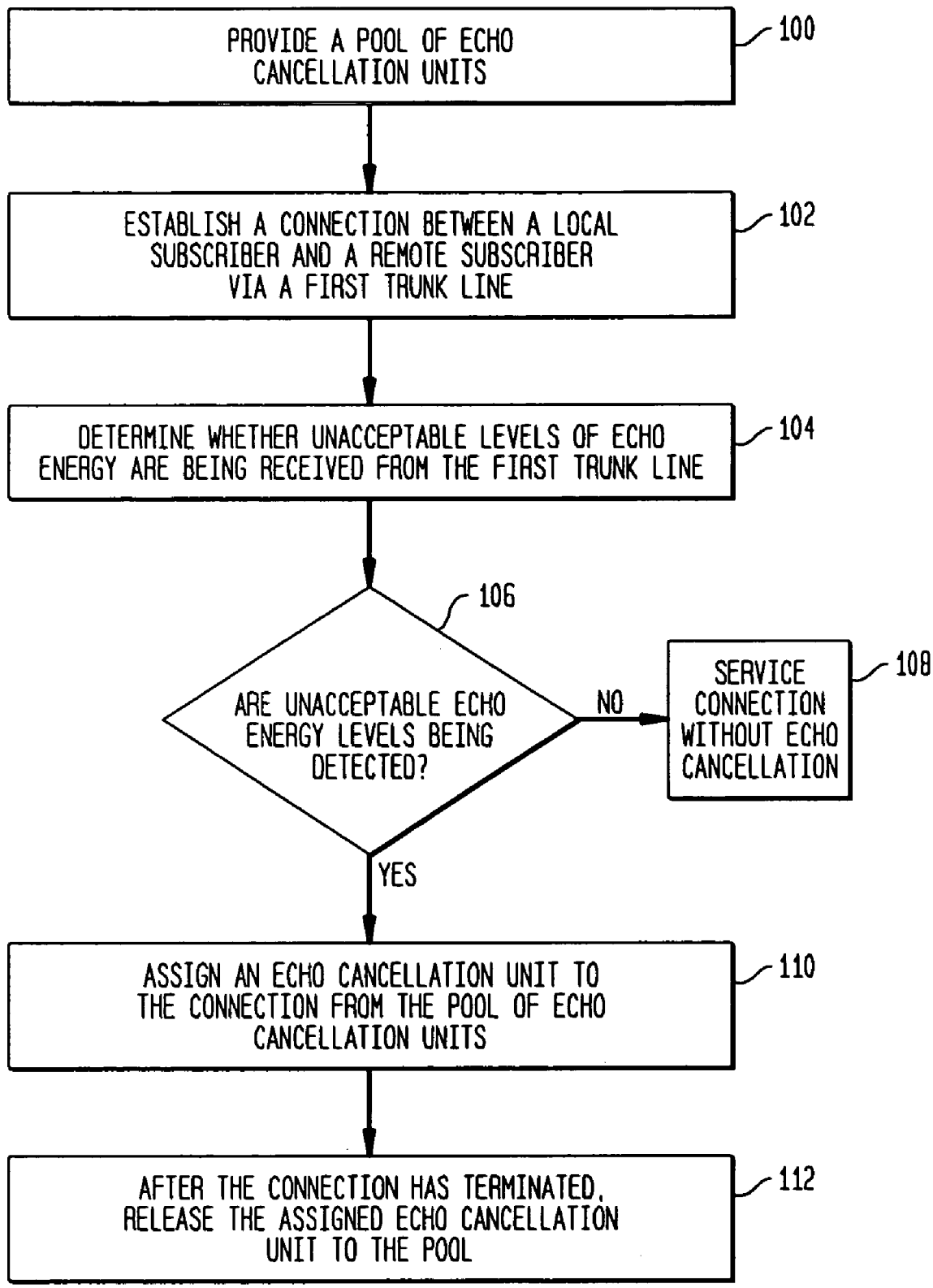

METHOD AND APPARATUS FOR PERFORMING ECHO CANCELLATION WITHIN A COMMUNICATION NETWORK

TECHNICAL FIELD

The invention relates generally to communication systems and, more specifically, to communication systems using switching centers to provide circuit connections between remote user devices.

BACKGROUND OF THE INVENTION

In a telephone switching center, problems arise when relatively large echoes are received from one or more of the outgoing trunks. To address this problem, each of the outgoing trunks in a switching center has traditionally been assigned a dedicated echo cancellation unit to suppress any echoes received from the trunk. However, only a small percentage of the outgoing trunks in a switching center normally experience echo problems during normal system operation. Therefore, more echo cancellation functionality is being provided than is necessary to ensure quality communication in the network.

Therefore, there is a need for a method and apparatus for suppressing harmful echoes in a switching center that does not require dedicated echo cancellation functionality on each outgoing trunk.

SUMMARY OF THE INVENTION

The present invention relates to a system for performing echo cancellation within a switching center of a communication network. The system uses a pool of echo cancellation units that are individually allocated to specific communication connections being supported by the switching center based on need. The system first determines whether intolerable echoes are being returned within a particular communication connection. If so, the system allocates one of the echo cancellation units from the pool to the connection. When the communication connection later ends, the echo cancellation unit is returnd to the pool for use by another communication connection. Thus, the number of the echo cancellation units that need to be provided within the switching center to ensure quality communication within the network is significantly reduced.

BRIEF DESCRIPTION OF THE DRAWINGS

FIG. 4 is a flowchart illustrating a method for allocating echo cancellation units within the switching center of a communication network in accordance with one embodiment of the present invention.

DETAILED DESCRIPTION

Figure 1:
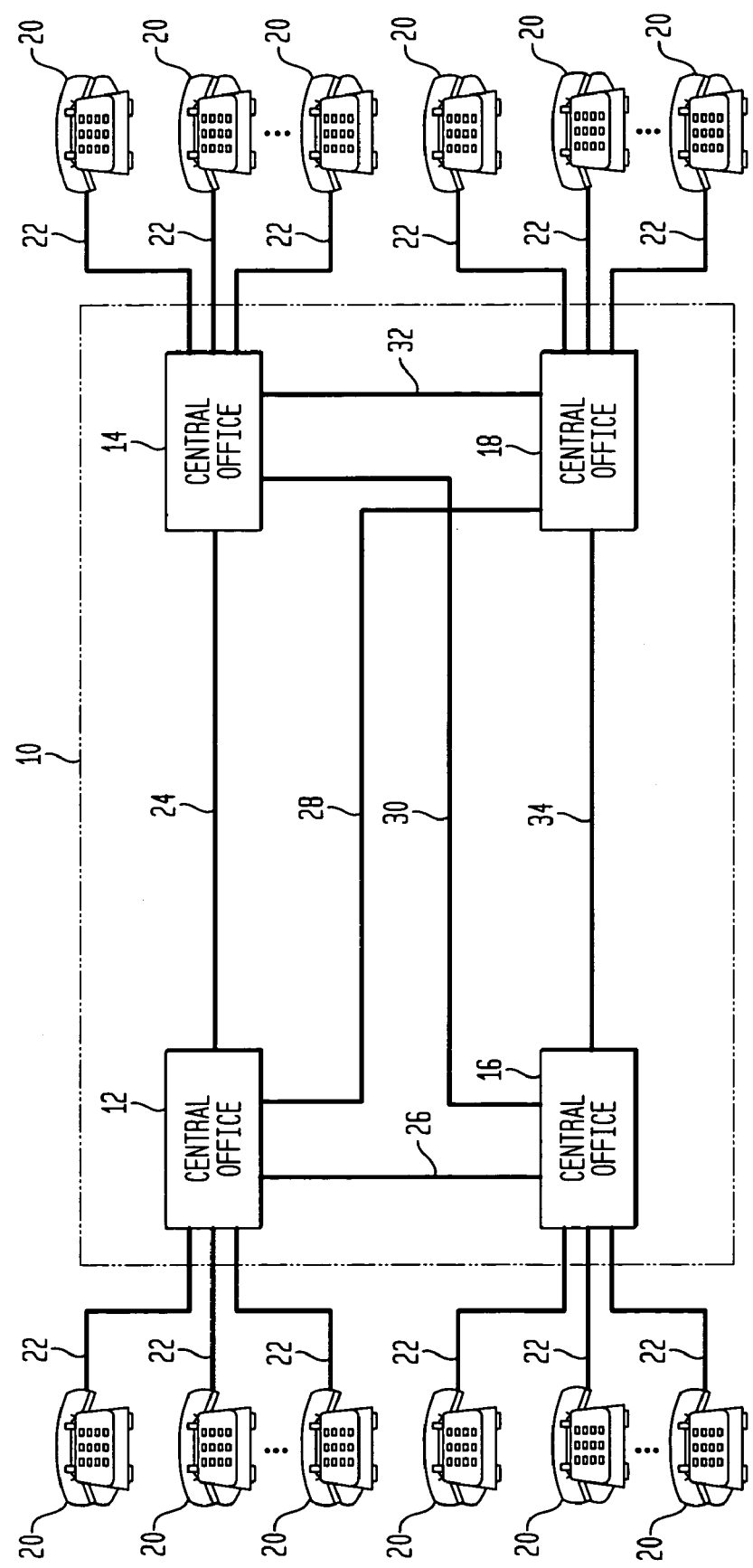
FIG. 1 is a block diagram illustrating a public switched telephone network (PSTN) that can utilize the principles of the present invention.

FIG. 1 is a block diagram illustrating a public switched telephone network (PSTN) 10 that can utilize the principles of the present invention. As illustrated, the PSTN 10 includes a plurality of central switching offices 12, 14, 16, 18 for providing switching services within the PSTN 10. Each of the central offices 12, 14, 16, 18 is coupled to a corresponding plurality of local user devices 20 via a plurality of local loops 22. In addition, each of the central offices 12, 14, 16, 18 is coupled to each of the other central offices 12, 14, 16, 18 in the PSTN 10 via a dedicated trunk 24, 26, 28, 30, 32, 34. For example, with reference to FIG. 1, central office 12 is connected to central office 14 via trunk 24, central office 12 is connected to central office 16 via trunk 26, and so on. It should be appreciated that the PSTN 10 illustrated in FIG. 1 has been made relatively simple for illustration purposes and that a typical PSTN will generally include a much larger number of central offices and corresponding trunks.

In a preferred embodiment, the user devices 20 are conventional telephone units or private branch exchange (PBX) systems that are used primarily for voice communication. However, other types of user device can also be used in accordance with the present invention, such as computer terminals having modem functionality. The trunks 24, 26, 28, 30, 32, 34 are relatively high bandwidth transmission media that can each simultaneously carry multiple independent voice or data channels. Typically, communications over a trunk will be performed digitally (e.g., using pulse code modulation techniques) and the individual channels will be time division multiplexed onto the trunk. However, analog data transmission and alternative multiple access schemes can also be used. If high traffic levels are anticipated between a given pair of central offices, a group of trunks (i.e., a trunk group) will often be provided between the offices.

In a typical call setup procedure, a caller associated with one central office (e.g., central office 12) sends a request to that central office (using an associated user device 20) to establish a connection with a remote party associated with another central office (e.g., central office 18). The first central office 12 then directs the request through a corresponding trunk 28 to the other central office 18. Upon receipt of the request, the other central office 18 signals the called party via an associated user device 20 that a connection has been requested. If the party answers the call, the connection is established and a two-way communication ensues through the corresponding trunk 28. Although not apparent from FIG. 1, connections involving one or more intermediate switching centers between the source and destination central offices are also possible (e.g., for long distance calls).

Occasionally, one or more of the trunks coupled to a particular central office will return echoes when the central office sends a communication signal over the trunk. That is, a portion of the communication signal will be reflected back to the central office from the trunk because there is an impedance mismatch (i.e., a discontinuity) somewhere on or after the line. For example, with reference to FIG. 1, there may be a discontinuity on trunk 24 that reflects a portion of a communication signal being delivered from central office 12 to central office 14, back to central office 12. The reflected signal might then be erroneously delivered to one or more of the user devices 20 associated with central office 12, thereby reducing communication quality in the PSTN 10. The discontinuity can be caused by any of a number of different sources, such as an analog hybrid circuit, an analog trunk circuit, a termination to an analog phone, a damaged electrical cable or optical fiber, and others.

Figure 2:
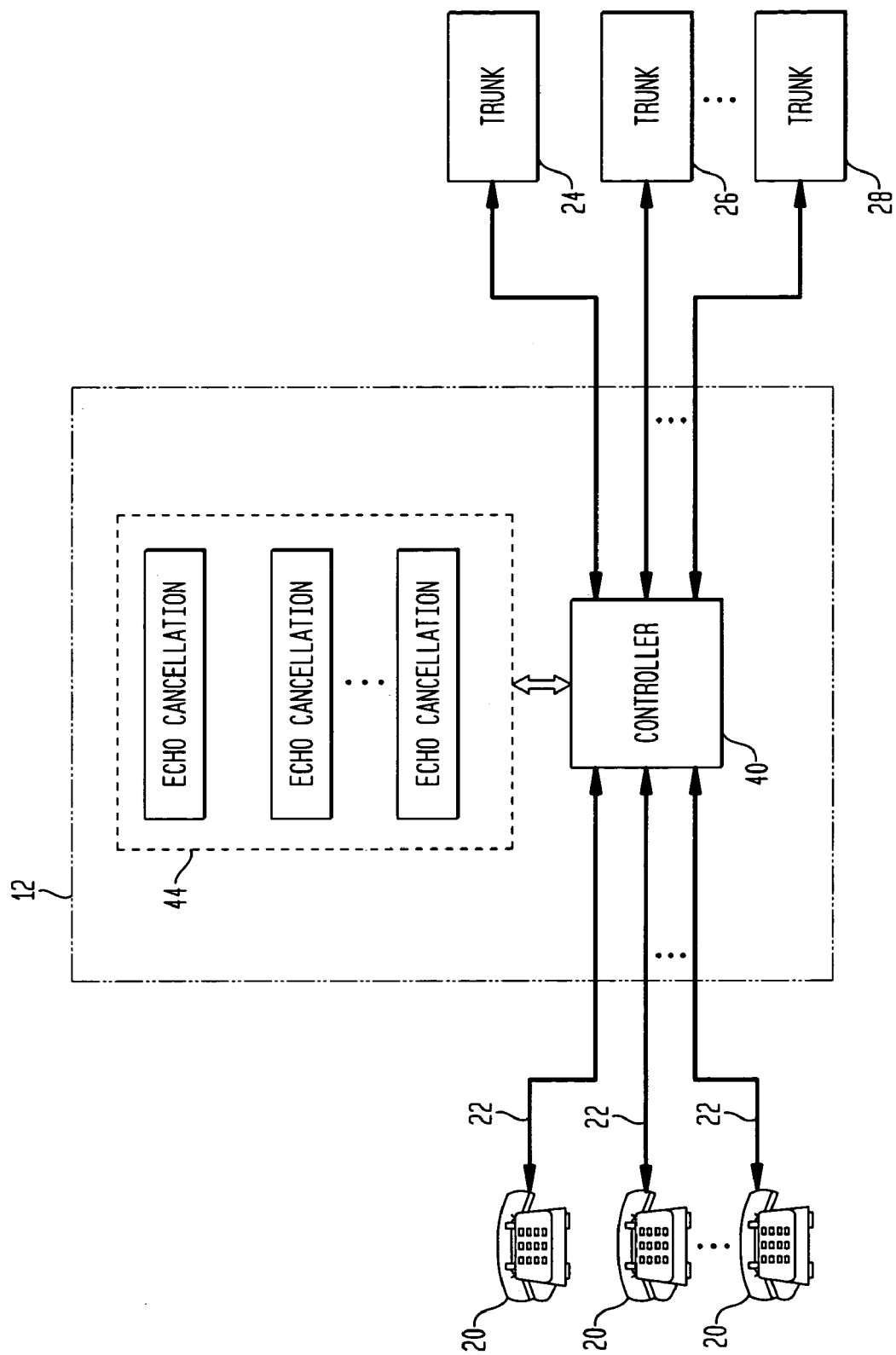
FIG. 2 is a block diagram illustrating functionality within a central office of a PSTN in accordance with one embodiment of the present invention.

FIG. 2 is a block diagram illustrating functionality within a central office 12 that is capable of reducing the harmful effects of echoes within the PSTN 10 in accordance with one embodiment of the present invention. As before, the central office 12 is connected to a plurality of local user devices 20 and a plurality of trunks 24, 26, 28. As illustrated, the central office 12 includes a controller 40 and a pool of echo cancellation units 44. The local user devices 20 and the trunks 24, 26, 28 are each coupled to the controller 40 which, in turn, is coupled to the pool of echo cancellation units 44. The controller 40 is operative for performing most of the typical functions associated with a central office 12. In a preferred embodiment, the controller 40 includes at least one digital processing device for performing some or all of its assigned functions. For example, the controller 40 can include a general purpose microprocessor, a digital signal processor, a reduced instruction set computer, a complex instruction set computer, a field programmable gate array, an application-specific integrated circuit, and/or other such devices. In addition, the controller 40 may include supplemental, special purpose hardware equipment for use in performing some functions. Among other things, the controller 40 is operative for performing conventional telephone switching services within the central office 12. For example, if a user at one of the local user devices 20 requests a connection to a remote user (e.g., by dialing a telephone number associated with the remote user), the controller 40 will couple the local user device 20 to the appropriate trunk 24, 26, 28 for establishing a communication connection between the local user device 20 and the remote user. The controller 40 is also capable of coupling one local user device 20 to another local user device 20 for establishing a communication connection therebetween. The controller 40 can perform the switching function in any known manner (e.g., electronically or electro-mechanically).

In accordance with the present invention, the controller 40 is also operative for providing echo cancellation services for communication connections being supported by the central office 12. The echo cancellation services are provided on an "as needed" basis, using the pool of echo cancellation units 44. The controller 40 first determines whether intolerable echo energy is being received from a trunk associated with a particular communication connection. The controller 40 then allocates an echo cancellation unit from the pool of echo cancellation units 44 to the communication connection if intolerable echo energy has been detected. Typically, the act of allocating an echo cancellation unit to a communication connection will comprise routing corresponding communications through the echo cancellation unit. When the communication connection is terminated, the allocated echo cancellation unit is released back to the pool 44.

In a preferred embodiment, the pool of echo cancellation units 44 includes one or more multi-channel hardware units for performing echo cancellation. Such devices are available commercially and are generally well known in the art. For example, one such unit is a 64 ms, T1, Echo Canceler Unit sold by Tellabs having model number 2572. Alternatively, a plurality of individual hardware-based echo cancellation devices can be provided. In another approach, the pool of echo cancellation units 44 is implemented using a digital processing device having a limited amount of computational resources available for performing echo cancellation. Thus, the digital processing device is only capable of executing an echo cancellation routine for a limited number of communication connections simultaneously. Using this approach, an echo cancellation unit is "allocated" to a communication connection by allowing an echo cancellation routine to be executed within the limited resources of the digital processing device for the communication connection. Other types of echo canceler pools can also be used.

In one embodiment of the invention, after a communication connection has been established between a local user device 20 and a remote user device, the controller 40 waits for input from the local user device 20 indicating that signal reflections are being detected at the local user device 20. If such input is received, the controller 40 allocates an echo cancellation unit from the pool 44 to the connection. For example, while communicating with a remote party through a telephone unit, a local user associated with central office 12 may hear signals that he does not believe are originating from the remote party. In response, the local user can press a predetermined key (e.g., the # key or a dedicated function key) on the telephone unit indicating that undesirable echoes are being audibly perceived. The controller 40 detects the key depression and proceeds to allocate one of the available echo cancellation units within the pool 44 to the communication connection. The selected echo cancellation unit then services the communication connection for the remainder thereof. When the connection is terminated (e.g., one of the parties hangs up), the echo cancellation unit allocated to the connection is released for use by another communication connection within the central office 12. Thus, an echo cancellation unit will only be allocated to a communication connection when the quality of communication within the connection is below a user tolerance level.

In a conventional PSTN, the central office no longer recognizes keypad signals received from the local user devices as commands once a telephone connection has been established. Thus, to implement the above-described approach in a PSTN, the controller 40 must be programmed to detect keypad-returnd signals from a user device during a communication connection. In another embodiment of the invention, the inventive principles are implemented within a private branch exchange (PBX) server that is capable of detecting the depression of special function keys on the keypad of an extension telephone to determine that echo cancellation services are needed. For example, each extension telephone associated with the server can include a key labeled "Echo Cancellation" that can be pressed by a user when intolerable echoes are audibly perceived. The controller within the PBX server then allocates echo cancellation resources to the connection in response thereto. In yet another embodiment, the inventive principles are implemented within an integrated services digital network (ISDN) system. As is well known, an ISDN system includes a separate signaling channel that is used to carry commands, among other things, within the system. A user within the ISDN system transmits a signal to the ISDN server, via the signaling channel, indicating that intolerable echoes are being perceived. The ISDN server then allocates the necessary echo cancellation functionality to the connection.

In another approach, the controller 40 assigns one of the echo cancellation units within the pool 44 to a communication connection at the time of call initialization (or slightly thereafter). The controller 40 then monitors the assigned echo cancellation unit to determine whether significant echo cancellation activity is actually occurring. If the echo cancellation unit is not performing significant echo cancellation for the communication connection, the controller 40 will release the echo cancellation unit and return it to the pool 44 for use by another connection. If the echo cancellation unit is performing significant echo cancellation, the controller 40 will allow the echo cancellation unit to continue to service the connection for the duration thereof. An echo cancellation unit can detect the existence of echoes by examining the energy of a communication signal before and after the cancellation process. In a preferred approach, the controller 40 will only allow an echo cancellation unit to continue to service a particular communication connection if greater than a threshold amount of echo cancellation is being performed. Thus, small echoes that do not normally compromise communication quality will be ignored.

Figure 3:
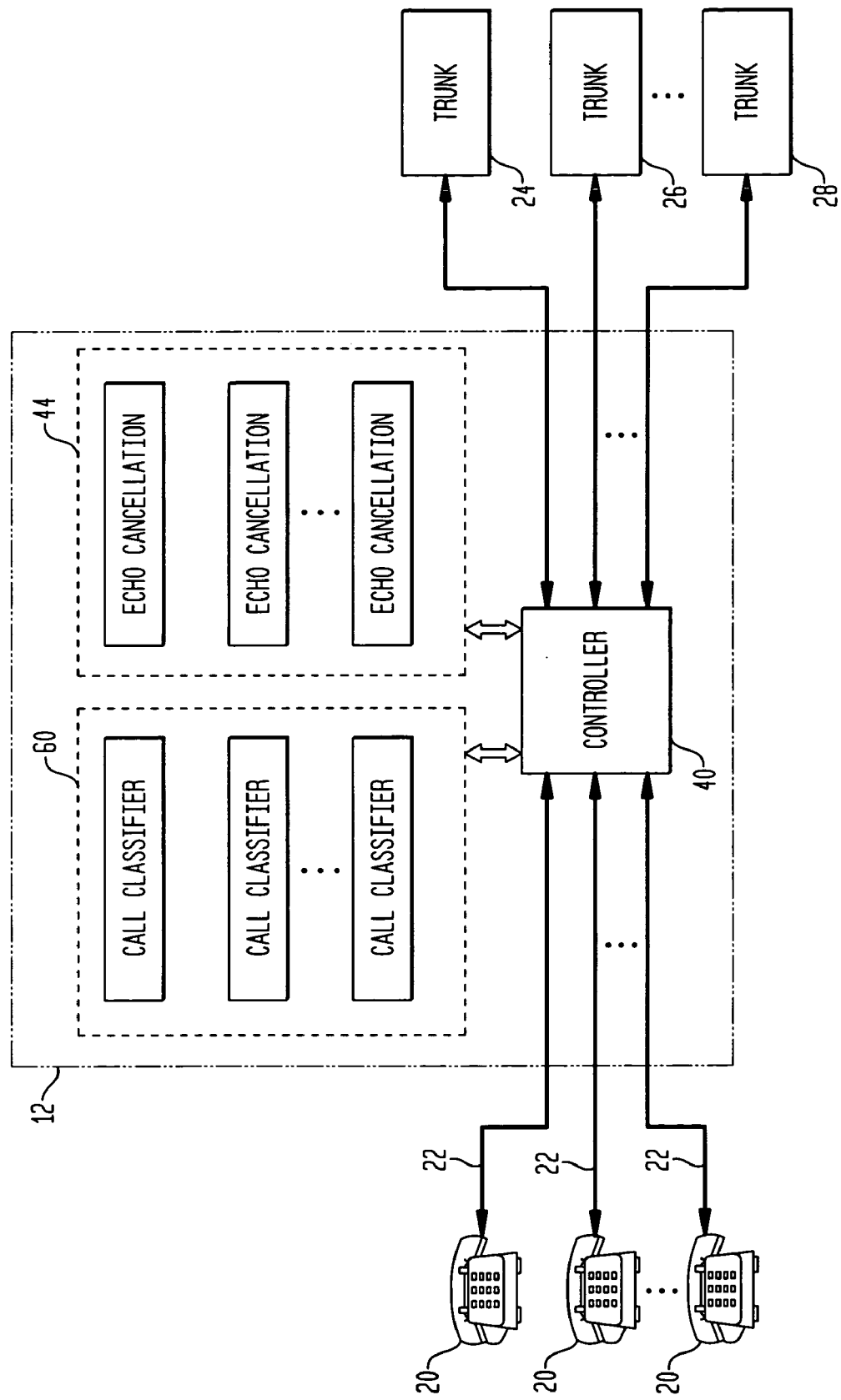
FIG. 3 is a block diagram illustrating functionality within a central office of a PSTN in accordance with another embodiment of the present invention.

FIG. 3 is a block diagram illustrating another embodiment of central office 12 in accordance with the present invention. In addition to the previously described functionality, the central office 12 of FIG. 3 includes a pool of call classifier units 60. During call initialization (or slightly thereafter), the controller 40 assigns one of the call classifier units from the pool 60 to the communication connection for use in determining the extent of echo generation associated with the connection. If the call classifier detects echo generation above a predetermined threshold level, it signals the controller 40 which assigns an echo cancellation unit to the connection from the pool 44. If the call classifier does not detect the requisite echo levels within a predetermined time interval after assignment, the call classifier is released back to the call classifier pool 60 and an echo cancellation unit is not allocated to the connection. The threshold echo level used by the call classifier can be specified, for example, as an absolute power level or a power level that is relative to the level of a corresponding transmitted signal. Call classification structures and techniques are generally well known in the art. In a PBX system, call classification functionality is generally provided as an internal feature of the switch.

Typically, the number of trunks 24, 26, 28 associated with a central office 12 will greatly exceed the number of echo cancellation units within the corresponding pool of echo cancellation units 44. The number of echo cancellation units provided within the pool 44 will generally be selected based upon the anticipated maximum number of trunks that will simultaneously have echo generation problems. The appropriate number can be determined based on, for example, historical performance records or predicted trunk defect rates.

In one embodiment, the controller 40 maintains a database identifying which outgoing trunks and/or which outgoing phone numbers have required an echo cancellation unit in the past. The database can then be used to automatically assign an echo cancellation unit to a given communication connection at the time of call initialization when the same routing is encountered. The database can also be used to identify defective trunks or communication paths that need to be repaired or replaced.

FIG. 4 is a flowchart illustrating a method for allocating echo cancellation units within the switching center of a communication network in one embodiment of the present invention. The method can be utilized, for example, within the central office of a conventional telephony system, within a PBX server unit, or within an ISDN system controller. First, a pool of echo cancellation units is provided within the switching center for use with selected communications connections being supported by the switching center (step 100). A communication connection is then established between a local subscriber and a remote subscriber via a first trunk coupled to the switching center (step 102). Next, it is determined whether intolerable reflections are being received at the switching center from the first trunk (step 104). This determination can be made by the local subscriber or by functionality within the switching center itself (e.g., using a call classifier or an echo cancellation unit). If intolerable reflections are not being detected, the communication connection continues without echo cancellation (steps 106 and 108). When intolerable reflections are detected for the connection, an echo cancellation unit is allocated to the connection from the pool of echo cancellation units for use during the remainder of the connection (steps 106 and 110). If an echo cancellation unit was used to detect the intolerable reflections, then this unit will normally be the one allocated to the connection. After the communication connection has ended, the allocated echo cancellation unit is released back to the pool for use by another connection (step 112).

Although the present invention has been described in conjunction with its preferred embodiments, it is to be understood that modifications and variations may be resorted to without departing from the spirit and scope of the invention as those skilled in the art readily understand. For example, the inventive principles are not limited to use within conventional telephony networks but can be advantageously implemented in any communication system that utilizes switching centers to provide circuit connections between remote communication entities. Such modifications and variations are considered to be within the purview and scope of the invention and the appended claims.

What is claimed is:

1. A switching center, comprising:

a plurality of first ports for use in coupling the switching center to a plurality of local user devices;

a plurality of second ports for use in coupling the switching center to a plurality of external transmission media, each of said plurality of external transmission media being coupled at an opposite end to another switching center within the communication network;

a switch for selectively coupling individual first ports to individual second ports within the switching center for use in establishing communication connections between local user devices and remote user devices in the communication network;

a pool of echo cancellation units that are each capable of reducing echoes received by said switching center from an external transmission medium;

a call classifier operable to detect an echo energy level from a first external transmission medium associated with a first communication connection; and an allocation unit for allocating an echo cancellation unit from said pool of echo cancellation units to the first communication connection being supported by the switching center in response to detection, by the call classifier, of echo energy above a threshold level from a first external transmission medium associated with said communication connection, wherein the first communication connection is between a first local user device and a remote user device.

2. The switching center of claim 1, wherein the allocation unit is further operable to terminate allocation of the echo cancellation unit to the first communication connection in response to detection of echo energy, from the first external transmission medium, below the threshold level.

3. The switching center of claim 2, wherein the call classifier is further operable to thereafter monitor the first communication connection, while the first local user device and remote user device are coupled to the first external transmission medium, for at least one of echo cancellation activity and echo energy and wherein the allocation unit reallocates an echo cancellation unit from said pool of echo cancellation units to the first communication connection in response to detection, by the call classifier, of echo energy above a threshold level.

4. The switching center of claim 1, wherein the allocation unit is further operable to thereafter monitor the first communication connection, while the first local user device and remote user device are coupled to the first external transmission medium, for at least one of echo cancellation activity and echo energy and discontinue reallocation of the echo cancellation unit to the first communication connection in response to detection of echo energy below a threshold level.

5. A method for performing echo cancellation within a switching center of a communication network, said switching center being coupled to a plurality of local user devices and a plurality of external transmission media, said method comprising the steps of:

providing at least one echo cancellation unit and call classifier within said switching center;

coupling a first local user device to a first external transmission medium as part of a communication connection between the first local user device and a remote user device;

the call classifier detecting an echo energy level on the first external transmission medium; and in response to the call classifier detecting, on the first external transmission medium, an echo energy level exceeding a selected magnitude, performing echo cancellation on the communication connection.

6. The method of claim 5, further comprising:

the call classifier thereafter monitoring the first external transmission medium, while the first local user device and remote user device are connected, for echo energy; and in response to the detected echo energy thereafter failing to exceed a selected magnitude during the communication connection between the first local user device and the remote user device, discontinuing echo cancellation of signals on the first external transmission medium.

7. The method of claim 6, further comprising:

in response to echo energy on the first external transmission medium, while the first local user device and remote device are connected, again exceeding a selected magnitude during the communication connection between the first local user device and remote user device, again performing echo cancellation on the communication connection between the first local user device and remote user device.

8. The method of claim 7, further comprising:

in response to echo energy on the first external transmission medium failing to exceed a selected magnitude during the communication connection between the first local user device and remote user device, again discontinuing echo cancellation of signals on the communication connection between the first local user device and remote user device.

9. The method claimed in claim 5, wherein the at least one echo cancellation unit is a pool of echo cancellation units and further comprising:

allocating a first echo cancellation unit from the pool to the communication connection.

10. The method claimed in claim 5, when the detected echo energy fails to exceed the selected magnitude within a predetermined time interval after allocating the call classifier, the call classifier terminates the monitoring step.

11. A computer readable medium comprising processor executable instruction to perform the steps of claim 5.

12. A switching center, comprising:

a plurality of first ports for use in coupling the switching center to a plurality of local user devices;

a plurality of second ports for use in coupling the switching center to a plurality of external transmission media, each of said plurality of external transmission media being coupled at an opposite end to another switching center within the communication network;

a switch for selectively coupling individual first ports to individual second ports within the switching center for use in establishing communication connections between local user devices and remote user devices in the communication network;

at least one echo cancellation unit that is capable of reducing echoes received by said switching center from an external transmission medium;

a call classification means for detecting an echo energy level from a first external transmission medium associated with a first communication connection; and an allocation means for allocating said at least one echo cancellation unit to the first communication connection being supported by the switching center in response to detection, by the call classification means, of echo energy exceeding a selected magnitude from a first external transmission medium associated with said communication connection wherein the first communication connection is between a first local user device and a remote user device.

13. The switching center of claim 12, wherein the allocation means is further operable to terminate allocation of the at least one echo cancellation unit to the first communication connection in response to detection of echo energy, from the first external transmission medium, failing to exceed a selected magnitude.

14. The switching center of claim 13, wherein the call classification means is further operable to thereafter monitor the first communication connection, while the first local user device and remote user device are coupled to the first external transmission medium, for at least one of echo cancellation activity and echo energy and wherein the allocation means reallocates the at least one echo cancellation unit to the first communication connection in response to detection, by the call classification means, of echo energy exceeding a selected magnitude.

15. The switching center of claim 12, wherein the allocation means is further operable to thereafter monitor the first communication connection, while the first local user device and remote user device are coupled to the first external transmission medium, for at least one of echo cancellation activity and echo energy and discontinue reallocation of the at least one echo cancellation unit to the first communication connection in response to detection of echo energy failing to exceed a selected magnitude.

16. The switching center of claim 12, wherein the at least one echo cancellation unit is selected from a pool of echo cancellation units.

* * * * *